May 26, 1953 C. O. BALL 2,639,991
CANNING PROCESS
Filed Feb. 16, 1951
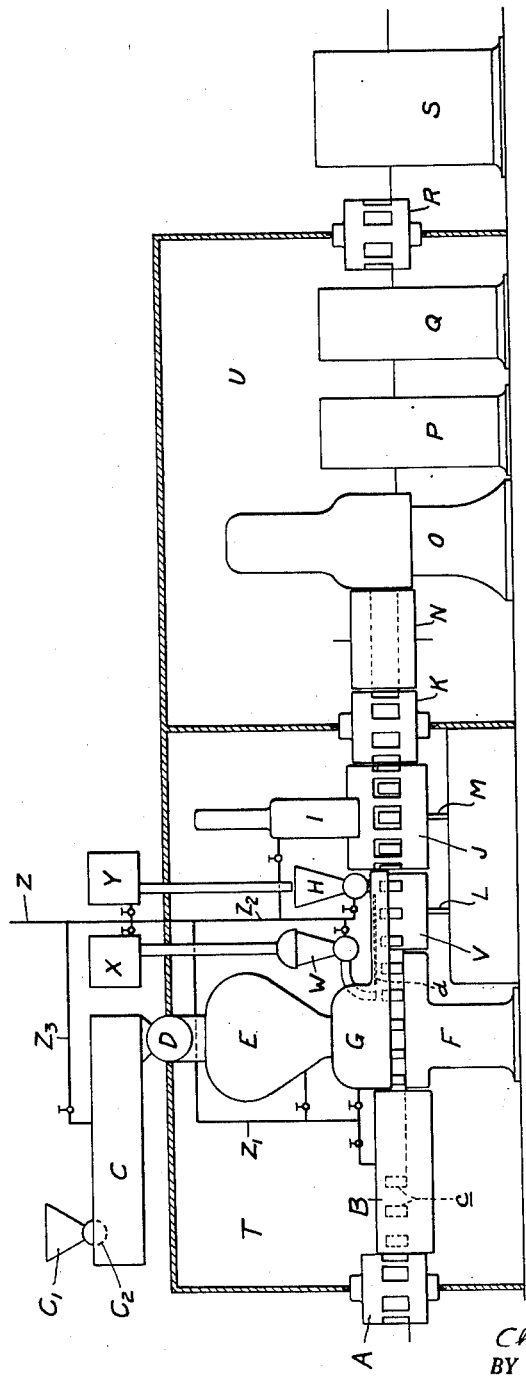
INVENTOR.
Charles Olin Ball
BY
Harold F. Scribner
ATTORNEY Patented May 26, 1953

2,639,991

UNITED STATES PATENT OFFICE 2,639,991

CANNING PROCESS

Charles Olin Ball, New Brunswick, N. J.

Application February 16, 1951, Serial No. 211,235

22 Claims. (Cl. 99—182)

This invention relates to canning processes, and more particularly to improvements in sterilization processes for food products which require temperatures considerably above 212° F., at atmospheric pressure, to ensure sterilization.

Food products for which this process is more especially suited are those commonly referred to as low-acid products, and a primary aim of the invention is to develop a process for the efficient and expeditious canning of low-acid foods including liquiform products such as milk, puree, strained foods, soups, and juices as well as solid or particulate types of food products such as chop suey, corn, peas, marine products, meat, stew, spaghetti, or carrots, to be canned with or without a sauce or other liquid.

This invention further aims to render available a food preservation process by means of which the desirable qualities possessed by the original product, i. e. color, texture, and flavor, are retained and preserved, after having been treated by the instant process effectively to destroy microorganisms, such as molds, yeast, bacteria that may be present in the food, cans, and/or lids, and capable of causing food spoilage or of being injurious to health.

A further aim of the invention is to effect rapid and thorough sterilization of food in a manner as to preserve the desirable qualities thereof, to package the product in containers, and to seal the containers under aseptic conditions in an atmosphere which need not be sterile, and by a machine which also need not be sterile whereby greatly to shorten the canning time and considerably to reduce the space required for sterilization and the expense entailed in maintaining that space sterile, and otherwise free of contaminating bacteria.

Adequate sterilization of foods of sour nature, acid type foods, may be accomplished with comparative ease by reason of the fact that spoilage microorganisms in an acid medium are inactivated within a matter of minutes at temperatures below the boiling point of water at atmospheric pressure, i. e. 212° F. Such temperatures, when applied to food products for short times, do not impair the quality of the food. On the other hand, foods of low-acidity, those having pH values not lower than 4.5, to be sterilized within a reasonable period of time, require sterilization temperatures substantially above 212° F. Conventional procedure in canning low-acid foods heretofore has been to heat sealed containers filled with the food in steam retorts under 6–24 pounds per square inch gauge pressure at temperatures varying from 230° to 265° F. for considerable periods of time after which the containers are cooled. Depending largely upon the size of the container, character of the food product, and other factors, the time required in holding sealed containers at the sterilization temperature may necessarily be long and protracted to ensure the complete and thorough penetration of the heat to the center of the packaged product, and it has been found that prolonged heating adversely affects the quality of the food in respect to color, flavor, and structure, this deleterious effect being more pronounced on the food at the peripheral regions of the container.

In respect to deleterious effects of time and heat upon quality, I have found that the time factor predominates over the temperature factor; in respect to the destruction of microorganisms, however, the temperature factor has a much more profound effect than the time factor. Hence, if the food could be sterilized by heating quickly throughout to a relatively high temperature, above 265° F., for example, for a short period of time, the quality would be less impaired than would follow if the food were heated to a moderate temperature, below 245° F., for example, for a much longer time. If the transmission of heat through the product is slow, under either procedure, the quality is impaired by an overtreatment with heat. In the case of the high temperature procedure, the peripheral portions of the food especially are severely impaired in quality.

The present invention aims to provide a process of canning by which the food may be thoroughly and uniformly sterilized at a relatively high temperature, 265° F. or higher, for a short period, before the food is placed in the containers. Products so treated are found, after canning, still to retain much of their original quality. In addition, the invention aims to provide a canning process in which the possibility of recontamination of the product, containers, and lids or covers therefor, is effectively prevented during the filling and sealing operations.

In achieving the objectives of this invention, it is proposed to heat the food rapidly and uniformally throughout, to a relatively high temperature, i. e. a temperature higher than the boiling point of the product liquid at atmospheric pressure, and to prevent boiling of the product liquid at that higher temperature, by carrying out the heating process in a chamber maintained under superatmospheric pressure. In sterilizing some food, such as chicken and pieces of meat, the objective of rapid substantially uniform relatively high sterilization temperatures may also be attained by steam injection preferably as by piercing the product with one or more tubular needles and simultaneously forcing steam into the interior portions so that the product becomes heated from within as well as from without. After the sterilization heat treatment, which may either completely or somewhat less than completely sterilize the food, the food is cooled to a filling temperature, which latter temperature is still "above boiling" temperature, and under superatmospheric pressure. After filling, and either with or without supplementary liquid added and while still under superatmospheric pressure, sterilized lids are applied to the filled containers "finger tight," and the closed containers removed from the pressure chamber to a sealing machine, proximately located but in a room or chamber maintained at a pressure preferably lower than that of the filling chamber. The differential in pressures between the two chambers is to be such as invariably to cause active generation of steam, in at least part of the contents of the containers, after the containers are transferred into the sealing chamber and prior to the completion of sealing, for such ebullition not only creates a "plus" pressure within the container, but the evolvement of steam maintains sterility and prevents entrance of air and contaminating bacteria into the containers during the transporting and sealing thereof.

Other objects and advantages will be in part indicated in the following description and in part rendered apparent therefrom in connection with the apparatus disclosed in the annexed drawings.

The figure illustrated in the drawing represents, in schematic form, an apparatus all or portions of which may be used to practice the invention, all parts of the apparatus being of conventional design and construction and therefore, detailed description of the several components is deemed unnecessary.

In the drawing, the symbols T and U represent enclosures, chambers, rooms, or the like, within which superatmospheric pressures may be maintained, and also within which one or more operators may be stationed. The symbol C represents a product heater within which the food to be processed is heated to its maximum sterilization temperature, and held at that temperature, if necessary, after which it is cooled within a transfer valve indicated at D, through which the food is passed to the hopper E of the filling machine F. Preferably, the hopper E is constructed to hold a pressure greater than the pressure existing in the filling chamber T.

Empty containers c are brought into the filling chamber T through a transfer valve A, and pass into a sterilizer B. From the sterilizer the containers, continuously shrouded in an atmosphere of steam maintained beneath a retaining canopy G, pass to the filler F where they receive the food product. After filling, the containers pass to a turret V, that is driven by a shaft L, which carries them under a nozzle leading from a hopper H. In passing under the nozzle, each container may receive a charge of water or other liquid of a temperature higher than the temperature of the product and higher than the boiling point of the liquid at the pressure at which the containers will be sealed.

The containers then pass to a second turret J, which is rotated by a shaft M, and while on this turret each container receives a lid or cover from a sterilizer I. At this stage in the process the lids or covers are applied "hand tight" so as not to effect a seal.

The containers filled with the food product, supplemented with added water or liquor, and with lids loosely applied, are then passed from the filling chamber T to the sealing chamber U through a conventional rotary valve K, and delivered to a turret N adjacent to a sealing machine O. Container lids that cannot be partially clinched or otherwise secured on the container, may be held in place during this part of their travel by auxiliary clamping devices carried in the pockets of the valve K, and turret N. On reaching the sealing machine O, the container lids are tightly and permanently secured, and the sealed container passes into a conveyor P where the containers are so manipulated that the food product therein contacts every part of the inner surface. The sealed containers may be retained in the conveyor P for a period necessary to permit sterilization of the food product to be completed, provided the sterilization of the food and containers had not previously been rendered complete. Thereafter, the sealed containers of food may pass into a cooling device Q, for at least partial cooling while still within the superatmospheric pressure of the chamber U, and from the cooler Q, through a rotary exit valve R into the outside normal atmosphere of the plant. Cooling may be completed in a supplementary cooling device S.

In accordance with this invention, it is proposed to cause the containers to issue steam as they pass from the filler chamber and through all subsequent stages on their course to the sealer, and to ensure this in some cases, provision is made to deliver liquid into the container at the filler, either before or after the main portion of the food product has been inserted. This liquid is of a nature such that it becomes a component part of the food product. The temperatures of the liquid, when put into the container prior to the filling of the solid portions of the product may equal or may be somewhat below or somewhat above the boiling temperature of the product liquid at the pressure prevailing in the filling room. For this purpose, a vapor-tight hopper W is provided in the system and which is supplied with a spout leading under the steam canopy G. Where the food product is of particulate nature, e. g. peas, whole kernel corn, or pieces of meat, the supplementary liquid may be in the form of a sauce and delivered to the containers as from hopper W before the particulate product is inserted. The hoppers W and H receive their supplies from reservoirs X and Y respectively, which may, if desired, be located outside the filling room. Steam is supplied from a line Z to each of the reservoirs X and Y, and to hoppers W, H, to maintain the liquids at the desired temperatures. Temperature regulators and controls (not indicated) are provided for the steam entering the respective components of the entire apparatus, as will be understood.

Within the steam canopy G and positioned above the path of travel of the containers, I prefer to place a condenser $d$, preferably non-corrosive, which is maintained at a temperature which causes steam to condense into water and the latter to drip into the open-tops of the containers. Thus, water lost from the product as steam during and immediately subsequent to filling, is replaced as condensate as the containers are moved along under the canopy. A branch steam line $Z_1$, furnishes steam to the filler hopper E, canopy G, and container sterilizer B, each sub-line to the several units being automatically valve controlled. Another branch line $Z_2$ furnishes steam to the lid sterilizer I, and another line $Z_3$ furnishes steam to the product sterilizer C, the line to each unit being independently valve controlled and equipped with automatic temperature regulators. The product heater C is constructed not only to heat the product to its maximum sterilization temperature, but to hold the product at that temperature for the time necessary to accomplish the degree of sterilization required, and its steam line is under very sensitive and precise automatic control to ensure that all parts of the product will receive the requisite amount of heat for the purpose intended, but not enough to result in quality deterioration.

The apparatus referred to is capable of manipulation and operation in various ways whereby to produce the desired results with a given product. For example, for continuous sterilization, the food product is fed to the product heater C from the hopper $C_1$, through a rotary valve $C_2$ at the bottom of the hopper. The food product is rapidly heated within the product heater, with or without agitation, to its maximum sterilization temperature within the range 250° F. to 310° F. and preferably between 280° and 300° F., in a period of time from 10 to 180 seconds, preferably from 10 to 90 seconds. The heating of the food product may be accomplished indirectly as by conduction of heat through the wall of the heater from steam in a surrounding jacket, directly by flowing steam into the product heater, by a combination of indirect and direct heating, and/or steam injections. In all cases, however, it is desirable that the food product be heated thoroughly and quickly under superatmospheric pressure conditions. For temperatures in the preferred range of from 280° to 300° F. the pressure should be within the range of from 35 to 53 pounds per square inch gauge. Gauges are provided on the several pieces of equipment so that the pressures may be watched and controlled, as will be understood. The food is held at its maximum sterilizing temperature for from 0 to 4½ minutes, preferably for between 0 and 30 seconds, and is then abruptly cooled to the filling temperature which is from approximately 100° to 270° F. and preferably, if complete sterilization is accomplished before filling, from 100° to 200° F. Abrupt cooling to filling temperature may be effected by suddenly reducing the pressure surrounding the food if the sudden drop in pressure does not physically injure the food, or if the product is one that may be injured by a suddent drop in pressure, cooling to filling temperature may be carried out by contact procedure with agitation while the pressure in the cooler transfer valve D is maintained at or near the pressure in the product heater. If the product is of liquiform nature and flows readily through tubes, desired pressure in the product during cooling is easily maintained by restricting the discharge of the product so as to create back pressure. If the product is of discrete particle nature, the pressure in the cooler may be maintained by means of a sterile non-condensible gas, such as air or nitrogen, at or near the pressure of the heater. Added steam may be used to assist in maintaining the desired pressure. In those cases in which physical injury of the food does not occur on suddenly reducing the pressure, the pressure in the cooler D may be as low as two pounds per square inch gauge. Cooling may also be achieved in from 5 to 60 seconds, preferably in from 5 to 30 seconds, by venting the cooler transfer valve at a controlled rate.

If the filling temperature is higher than 219° F., the pressure in the cooler may be any pressure between that of the product heater and the boiling pressure of the product liquid at the filling temperature; if the filling temperature is lower than approximately 219° F. the pressure in the cooler should be at least two pounds per square inch gauge, and may be maintained by means of externally supplied steam or sterile gas.

After cooling, the product passes from the cooler D into the hopper E of the filling machine in which a pressure is maintained substantially equal to, but which may be several pounds greater or somewhat less than the pressure in the filling room T. The pressure in the filling room T should be maintained within the range of from 4 to 30 pounds but preferably from 12 to 20 pounds, per square inch gauge. Such a superatmospheric pressure may be maintained in the filling room by fresh air, and is not so great as to discomfit operators even after relatively long periods of attendance. A pressure is maintained in the hopper E higher than the pressure of the filling chamber T when the food product is filled at or above the boiling temperature of the product liquid at the pressure of the filling chamber.

The foregoing procedural steps may be practiced on food products that desirably may be handled in batches. In such cases the product is introduced into the product heater in single charges or batches; each batch is heated to its maximum sterilization temperature, held at that temperature for the requisite time, then cooled and introduced into the filling hopper. The temperatures and pressures maintained in and about the product for batch operation are within the ranges set forth for continuous processing.

In accordance with this invention, it is proposed that the filled containers emit steam after filling and before sealing, and, to effectuate this result, regard must be given to the quantity of food product delivered from the hopper E into the container so that space is provided when necessary for supplementary liquid from one or both of the hoppers W and H. In relation to this provision, the handling of the container after filling and before sealing is logically divided into two stages; first, the stage prior to the removal of the container from the filling chamber; second, the stage following that removal. Emission of steam from the filled container during the second stage just referred to, is a primary objective of this invention, and is understood to be an inevitable accomplishment in the process whenever the sealing machine is located outside the filling chamber. Emission of steam from the filled container during the first stage referred to above, is not an inevitable occurrence in the porcess when the sealing machine is located outside the filling chamber but is an inevitable accomplishment in the process whenever the sealing machine is located in the same chamber as the filler. The generation of steam within the filled container during the first stage of handling is controlled by the operation which takes place in the filling machine F, of which the liquid hopper W is considered to be a part; the generation of steam within the filled container during the second stage of handling is controlled by the operation which takes place in the filling machine F, supplemented, if necessary, by the operation of delivery liquiform material from the hopper H.

The supplementary liquid, delivered from one or both of the hoppers W and H, may constitute as much as 40% of the volume. When supplementary liquid, which may be a sauce, is added from the hopper W, that liquid generally serves to influence the generation of steam in the container, and is at a temperature within the range of from 10° higher than the boiling temperature of the liquid at the pressure of the filling chamber down to room temperature. The temperature of the liquid in the hopper H may be any temperature between its boiling temperature at the pressure in the chamber T and room temperature. In both cases, the temperature maintained depends upon the temperature of the main portion of the food product, upon the proportion of the quality of the main product to that of supplementary liquid, and upon whether steam is to be generated by evaporation of the water content of solid pieces of food product or by the boiling of the supplementary liquid.

After filling the containers under superatmospheric pressure by such procedure as will produce the desired generation of steam in the filled container, the filled containers pass to the lid applying machine J, thence through the valve K if the sealer is located outside the filling chamber. The container and lid sterilizers B and J are supplied preferably with saturated steam, and the steam, for the main part, is confined within the sterilizers by reason of the pressure existing in the filling chamber; some steam may, however, through diffusion in the air of the filling room, issue from the ends of the sterilizers into the filling room. When higher container and lid sterilizing temperatures are required, superheated steam or heated sterile non-condensible gas may be supplied to the sterilizers. Saturated steam, superheated steam, sterile non-condensible gas, or a mixture of two or more of such media, at the pressure of the filling room, is also made to fill the interior of the canopy G within which the containers are filled and later conveyed to the point where they receive their covers, thus maintaining sterility and preventing entrance of viable microorganisms, should any such be present in the filling room. When issuance of steam occurs from the open, filled, container during this first stage of handling after filling, this also adds to the assurance that no microbiological contamination of the food will occur.

Upon receiving covers, loosely applied at the turret J, each container is passed to the sealing machine O through the transfer valve K and turret N. As heretofore mentioned, when the sealing machine is located outside the filling chamber, the pressure prevailing in and about the sealing machine is lower than the pressure prevailing in the filling chamber T so as invariably to create a differential calculated to cause the filled containers, with lids loosely attached, to emit protecting steam while they remain unsealed. While the containers are not tightly sealed, the covers are in very close proximity to the lips of the container openings and are held in this position with sufficient force to permit a pressure slightly greater than that of the atmosphere of the sealing chamber to build up within the container so that steam issues with some force from the container through the restricted space between the cover and the lip of the container. If the food has not been completely sterilized when placed into the containers, the filling temperature of the food should be within the range of from 230° to 270° F., the pressure in the filling chamber T should be from 12 to 30 pounds per square inch gauge, and the pressure in the sealing chamber U, if separate from the filling chamber, should be maintained within a range of from 2 to about 27 pounds, thus creating a differential in pressures less than 10 pounds. When the food is completely sterilized before filling, the temperature of the product when filled may vary from about 100° to about 225° F., preferably from about 100° to about 200° F., the pressure in the filling chamber may be maintained within a range of from 4 to 25 pounds, preferably from 10 to 20 pounds per square inch gauge, and the pressure in the sealing chamber maintained within a range of 0 to 5 pounds, but preferably at 0 pounds per square inch gauge. The preferred pressure of about 10 pounds or higher to be maintained in the filling chamber is to facilitate the maintenance of a satisfactory sterilization atmosphere with saturated steam in the container and lid sterilizers, as well as wherever there may be contact between the food product and the atmosphere. When the pressure in the filling chamber is too low to support a satisfactory sterilization atmosphere with saturated steam, superheated steam or sterile non-condensible gas at a temperature of from about 280° to about 500° F. at the pressure of the filling room may be used to maintain a sterilizing atmosphere in the container and container cover sterilizers and wherever there may be contact of the food product with the atmosphere.

In those instances wherein the food product is not completely sterilized before filling, the sterilization may be completed after sealing by holding the sealed containers in the conveyor P without intentional cooling until the residual heat of the product has completed the sterilization; then the sealed containers are cooled in one or both of the coolers Q and S. When sterilization of the product is completed before filling, the holding step in the conveyor P may be omitted.

*Processing procedure*

All surfaces of the filling mechanism, from which microorganic contamination could enter the food, must be maintained sterile by keeping them enveloped in saturated steam at the temperature corresponding to the pressure of the filling room. To ensure continued sterility of all parts of the filler which contact the food product and of the atmosphere which contacts the food product, the pressure of the filling room must be at least 4 pounds per square inch gauge.

The filling enclosure is equipped with air locks and ventilating facilities so that conventional filling and conveying apparatus may be operated therein by attending personnel. Under such conditions, if batch handling of the food product is either necessary or desirable, the food product to be sterilized may be brought into the enclosure in kettles or similar containers through an airlock entrance.

A desirable operation under the continuous system is to bring food, following its initial high temperature heat treatment and its cooling to filling temperature, into the hopper of the filler at a temperature slightly above (from 0.5° to 5° F.) boiling temperature corresponding to the pressure of the filling room atmosphere. The hopper may be an enclosed, pressure tight, hopper, in which the pressure is somewhat higher than the pressure of the filling room atmosphere or it may be a hopper in which pressure equal to that of the room atmosphere is maintained. If the hopper is at the same pressure as the atmosphere of the filling room, there is an active generation of steam from the product as it enters the hopper, thus giving a flow of steam from the hopper, which prevents air from entering the hopper, and there is still a mild generation of steam from the product when it is filled into the containers. This steam assists in maintaining a saturated steam atmosphere within a canopy within which the open, filled, containers are conveyed to the point at which the containers receive their sterile covers and on to the point at which either the containers are sealed or the containers enter a valve which discharges them from the pressure filling chamber into the sealing chamber, maintained at a lower pressure.

If the hopper is at a higher pressure than that of the atmosphere of the filling room, there is an active generation of steam from the product as it is filled into the containers, thus giving a flow of steam from the container, which drives air out of the container if there is any present therein, and prevents air from entering the container. This steam contributes to the maintenance of a saturated steam atmosphere within the canopy within which the open, filled, containers are conveyed from the point of filling to the station of the next operation.

If the sterile product is brought into the hopper of the filler at a temperature lower than the boiling point corresponding to the pressure of the filling room, a small amount of liquid, usually water, at a temperature somewhat higher than the boiling point of the liquid at a pressure of the filling room, may be put into the container from hopper W separately from the main portion of the product. If the product is of discrete particle type, this liquid may be put into the container either ahead of the product or following the product; if the product is of liquiform type, the additional liquid is put into the container on top of the product. The boiling of this liquid generates steam to protect the product in the container from the entrance of contaminating bacteria during the first stage of handling after filling.

The product may be filled into the containers at a temperature even lower than the boiling point of the product liquid at the pressure which is maintained at the point of sealing the containers. In such a case, some sterile liquid, usually water, amounting to from 1 to 25 percent of the volume capacity of the container, at a temperature from 0.5° to 10° F. higher than the boiling point of the liquid at the pressure which is maintained at the point of sealing the containers, is put into the partially filled container from hopper H just before the container is loosely closed, either by means of a sterile lid or by other means, and just prior to being transferred from the filling chamber. The boiling of this liquid during the time the container is unsealed in the lower pressure of the region of sealing prevents the entrance of contaminating bacteria into the container, during the second stage of handling the containers after filling. Emission of steam from containers in the manner described is even capable of removing microorganisms from the container, and should isolated microorganisms happen to gain entrance, by incidental means, into a container during a filling operation, they are likely to be removed in the manner indicated.

The temperature of the liquid which is put into the container from hopper H for the purpose of producing steam must be high enough to enable it to retain temperature above its boiling point at the pressure in which the containers are sealed after suffering the cooling effect coming from contact with the cooler product in the container. When liquid, filled separately from the product, is used in the manner indicated, a loss of moisture from the particulate parts of the product is prevented when boiling of the added liquid takes place during the approach of the container to the sealing point. When separate liquid is added from hopper W before, simultaneously with, or immediately after the filling of the main portion of the product, to provide steam protection against contamination during or immediately after filling, this same liquid may serve also to give steam protection against contamination during the second stage of handling after filling, prior to the completion of the sealing operation.

While the method just described for generating steam by use of liquid at a temperature at which the liquid boils is the best method under certain conditions, a different procedure for accomplishing this result is sometimes preferred when the main body of the food product is in the form of solid pieces. In such a case, the generation of steam within the unsealed container is accomplished with a minimum of likelihood of the removal of solid or liquid portions of the food product from the container by following the procedure of first filling into the container from hopper W a measured quantity of sterile liquid at a temperature lower than its boiling point at any pressure which will surround the container prior to sealing, then filling solid pieces of food product into the container at a temperature higher than the boiling point of the product liquid at the pressure in which it is intended that steam will issue from the unsealed container to protect the contents from contamination with microorganisms from the surrounding atmosphere. The liquid in the container, by contact with the solid pieces of the food in the lower part of the container, cools these particles so that steam is not generated by surface or interior water of these lower particles after the container is filled; thus steam is generated by evaporation of surface and interior water of the solid particles in the upper part of the container only, and there is little tendency for the steam, being generated at a moderate rate from the solid pieces in the upper part of the container, to carry any of the solid or liquid parts of the food out of the container.

From the foregoing it will be perceived that this process of canning possesses many advantages among which may be noted that a sterilized product of superior quality results because sterilization, or at least the major portion of the sterilization, of the food is effected in an extremely short time at a very high temperature, this being accomplished by heating the food in pressure vessels quickly and thoroughly to the maximum temperature of sterilization, after which all parts of the food are simultaneously cooled very rapidly to or near the boiling point of the food liquid at the superatmospheric pressure prevailing in the filling chamber. When so cooled and while under the pressure existing in the filling chamber, the food may be delivered into previously sterilized containers in a nonboiling sterile state, or with but a slight degree of boiling to produce emission of steam while the containers travel from the filler to the station of the next operation. A further advantage resides in the accomplishment of aseptic sealing of containers in an atmosphere which need not be sterile and by machines which need not be sterile. The generation of steam within the loosely covered container protects the interior of the container and its contents from the entrance of contaminating microorganisms. With this process it becomes unnecessary to use protective measures in connection with the space required for the sealing machine or to incur their attendant expense.

It will be further seen that with this improved process, the processing time required to preserve low-acid foods is appreciably reduced with consequent savings in labor and steam costs and in the space required for the sterilization of the food. Additionally, essentially sterile conditions in a fresh atmosphere and one in which one or more attendants may work, need be maintained in only the filling room, and this feature makes additional protecting steps, e. g., a steam canopy of very simple nature, adequate to give virtual assurance of complete protection of the food from contamination during and immediately after filling. The fresh air atmosphere is maintained at a moderate superatmospheric pressure and is such as to make it possible to maintain sufficiently high steam temperatures in the container sterilizer, and lid sterilizer, to accomplish sterilization of the containers and lids, and in the steam canopy about the filler for maintaining sterile conditions in and about the mechanisms, without creating a pressure differential between the surrounding atmosphere and the saturated steam.

Briefly stated, six distinct patterns, in respect to the generation of steam within the filled container, are included in the use of this invention, as follows:

1. Solid portions of product, filled at temperature higher than boiling temperature of water is pressure of filling chamber, produce steam in open filled container, before the container is sealed by sealing machine, located in the same chamber with the filling machine.

2. Solid portions of product, filled at temperature higher than boiling temperature of water at pressure of filling chamber, produce steam in filled container during both the first and the second stages of handling the container after filling and before sealing by a sealing machine, located outside the filling chamber.

3. Solid portions of product, filled at temperature lower than boiling temperature of water at pressure of filling chamber, but higher than boiling temperature of water at pressure of the sealing chamber, produce steam in the filled container during only the second stage of handling the container after filling and before sealing by a sealing machine, located outside the filling chamber.

4. Liquiform portion of product, filled at a temperature higher than boiling temperature of the liquid at the pressure of the filling chamber, produces steam in the open filled container before the container is sealed by a sealing machine located in the same chamber as the filling machine.

5. Liquiform portion of product, filled at a temperature higher than the boiling temperature of the liquid at the pressure of the filling chamber, produces steam in filled containers during both the first and second stages of handling the container after filling and before sealing by a sealing machine located outside the filling chamber.

6. Liquiform portion of product, filled at a temperature lower than the boiling temperature of the liquid at the pressure of the filling chamber but higher than boiling temperature of the liquid at the pressure of the sealing chamber, produces steam in the filled container during only the second stage of handling the container after filling and before sealing by a sealing machine located outside the filling chamber.

Under actions 1, 2, 4, and 5, it is possible to return to the product in the open filled container water produced by condensing steam with a condenser beneath the canopy G, under which the open filled containers are conveyed to the point of receiving their covers. The water put into the containers in this manner replaces that which is lost by evaporation when steam is generated by the product.

Examples of the process as applied to specific low-acid types of food to follow.

*Example I.*—Vegetable product, having pH value in the intermediate range of 5.0 to 5.5, such as diced carrots or diced beets, are heated in bulk in a product heater of appropriate design of either a continuous or a batch type. The time required to heat the product to maximum sterilizing temperature of, say, 300° F. is approximately 60 seconds. The food product is not held at 300° F. but is put into a cooling operation immediately after the temperature of 300° F. is reached. The food is cooled to its filling temperature of, say, 215° F. in approximately 60 seconds, and by the time the temperature of 215° F. is reached, the product is sterile.

The product enters the sterile hopper of the filler at the temperature of 215° F. within a filling room maintained at a pressure of 20 pounds per square inch gauge by means of air which has been sterilized by filtering or by other means. All surfaces of the filler which contact the food during filling of the containers are sterile from previous treatment with steam under pressure, followed by continuous coverage of these surfaces with saturated steam at the pressure held within the filling chamber. During operation of the filler, these surfaces, as well as the upper portions of the containers and the food product in the hopper, are enveloped in saturated steam under 20 pounds gauge pressure, the pressure of the filling chamber, to protect the food product against contamination with stray microorganisms from the air of the room.

Into containers, which have been sterilized with saturated steam at 20 pounds gauge pressure for about three minutes in the container sterilizer, the sterile food is filled aseptically to about 92 percent of the capacity of each container. The open, filled, container, with its upper end enveloped in saturated steam at 20 pounds gauge pressure, is conveyed to a point where it receives a cover which has been sterilized by treatment with saturated steam at 20 pounds gauge pressure for about three minutes. The cover is clinched loosely to the lip of the container sufficiently securely to hold it in place against an interior pressure of two pounds per square inch. The container is removed from the filling room through a rotary valve into the outside atmosphere, in which the sealing machine is located and, with steam, generated by boiling of the food product within the container, issuing from the container through the restricted opening between the cover and the lip of the container, the container is sealed. The container is then cooled to the desired temperature for storage.

*Example II.*—Another way of processing diced carrots or diced beets in accordance with this invention is as follows:

Vegetable products, having pH value in the intermediate range of 5.0 to 5.5, such as diced carrots or diced beets, are heated in bulk in a product heater of appropriate design either of a continuous or of a batch type. The time required to heat the product to maximum sterilizing temperature of, say, 305° F. is about 45 seconds. The food product is not held at 305° F. but is put into a cooling operation immediately after the temperature of 305° F. is reached. The food is cooled to its filling temperature of, say, 255° F. in approximately 40 seconds.

The product enters the sterile hopper of the filler at the temperature of 255° F. within a filling room maintained at a pressure of 20 pounds per square inch gauge by means of fresh air which has been treated for sterilization by filtering or by other means and in which an operator works. All surfaces of the filler which contact the food during the filling of the containers are sterile from previous treatment with steam under pressure. During operation of the filler, these surfaces, as well as the upper portions of the containers, and the food product in the hopper, are enveloped in saturated steam under 20 pounds gauge pressure to ensure protection of the food product against contamination with stray microorganisms from the air of the room.

Into containers, which have been partially sterilized by treatment with saturated steam at 20 pounds gauge pressure for two minutes in a container sterilizer, the sterile food is filled aseptically to about 75 percent of the volume capacity of each container. Immediately after the diced food product is put into the container, sterile water or brine at a temperature of 265° F. is put into the container to fill the interstices between the solid pieces of food product. Since this water gives up a part of its heat immediately to the atmosphere of the room and to the solid pieces of the food product, only a small part of the water, most of which is near the top surface of the contents, retains a temperature as high as 260° F., the boiling temperature of water at the pressure being maintained in the filling room. The open, filled, container, with its upper end enveloped in saturated steam at 20 pounds gauge pressure, is conveyed to a station where it receives a cover, which has been partially sterilized by treatment with saturated steam at 20 pounds gauge pressure for 2¼ minutes in a cover sterilizer. At this point, the degree of sterilization of the assembled food product, container, and container cover is such that the sterilization can be completed by the amount of lethal heat which will be effective within the container during the period extending to the completion of cooling of the sealed container. The cover is held in loose contact with the lip of the container with sufficient resistance to hold the cover in place against an internal pressure of two or three pounds per square inch. The container is removed through a rotary valve from the filling room into the sealing room which is maintained at a pressure of about 18 pounds per square inch gauge by means of air, which has not been treated for sterilization, while the cover is held in loose contact with the container lip. The container, surrounded by the atmosphere of the sealing chamber, while steam, generated by boiling of the water, at the surface of the container contents and within the interstices between the solid portions of the food product, issues from the container through the restricted opening between the cover and the lip of the container, is sealed. The filled and sealed container is held without intentional cooling for about 60 seconds to complete the sterilization of the food product; then the container is cooled to the desired temperature for storage, being removed from the sealing chamber through a rotary valve either before intentional cooling is begun or after a part of the intentional cooling has taken place. The filling and sealing of each container is accomplished within the space of about 10 seconds.

*Example III.*—Diced potatoes, having a pH value of about 6.1, are heated in bulk in a product heater of appropriate design of either a continuous or a batch type. The time required to heat the product to maximum sterilizing temperature of, say, 290° F. is about 120 seconds. The food product is held at 290° F. for two seconds and is then passed into a cooling operation. The product is cooled to a filling temperature of 212° F. in about 60 seconds, and, by the time the temperature of 212° F. is reached, the product is sterile.

The product enters the sterile hopper of a filler in a filling chamber at the temperature of 212° F. The filling chamber is maintained at a pressure of 15 pounds per square inch gauge by means of air which has been sterilized by filtering or by other means. All surfaces of the filler which contact the food during filling of the container are sterile from previous treatment with steam under pressure. During operation of the filler, these surfaces, as well as the upper portions of the containers and the food product in the hopper, are enveloped in saturated steam under 15 pounds gauge pressure to protect the food product against contamination with stray microorganisms from the air of the room.

Into containers which have been sterilized by treatment with saturated steam at 15 pounds pressure for 6 minutes in the container sterilizer, the sterile food is filled aseptically to about 75 percent of the volume capacity of each container. Immediately after the product is put into the container, sterile water at a temperature of 220° F. is put into the container on top of the potatoes until the container is filled to at least 92 percent of its volume capacity. Since this water gives up a part of its heat immediately to the potatoes, only a comparatively small part of the water, most of which is near the top of the surface of the contents, retains the temperature of 220° F. The open, filled, container, with its upper end enveloped in saturated steam at 15 pounds gauge pressure, is conveyed to a point where it receives a cover which has been sterilized by treatment with saturated steam at 15 pounds gauge pressure for 6 minutes. The cover is held in loose contact with the lip of the container with sufficient resistance to hold the cover in place against an internal pressure of three pounds per square inch. The container is removed from the filling room through a rotary valve into the outside atmosphere while the cover is held in loose contact with the container lip and, with steam, generated by boiling of the water at the surface of the container contents, issuing from the container through the restricted opening between the cover and the lip of the container, the container is sealed. The container is then cooled to the desired temperature for storage.

*Example IV.*—Evaporated milk, having a pH value of about 6.1, is heated in bulk in a product heater of appropriate design of either a continuous or a batch type. The time required to heat the product to a maximum sterilizing temperature of, say, 285° F. is about 120 seconds. The evaporated milk is held at 285° F. for five seconds and is then passed into a cooling operation. The product is cooled to a filling temperature of 200° F. in about 55 seconds and, by the time the filling temperature of 200° F. is reached, the milk is sterile.

The product enters the sterile hopper in a filling chamber at the temperature of 200° F. The filling chamber is maintained at a pressure of four pounds per square inch gauge by means of air which has been sterilized by filtering or by other means. All surfaces of the filler, which contact the food during the filling of the container, are sterile from previous treatment with steam under pressure. During operation of the filler, these surfaces, as well as the upper portions of the containers and the food product in the hopper, are enveloped in saturated steam under four pounds gauge pressure to protect the product against contamination with stray microorganisms from the air of the room.

Into the containers, which have been sterilized by treatment with superheated steam or heated non-condensible gas at four pounds pressure for four minutes in the container sterilizer, the sterile food is filled aseptically to about 80 percent of the capacity of each container. The open, filled, container, with its upper end enshrouded in saturated steam at four pounds gauge pressure, is conveyed to a point at which sterile water at a temperature of 220° F. is put into the container on top of the milk until the container is filled to at least 91 percent of its volume capacity. The container is further conveyed into an atmosphere of saturated steam at four pounds gauge pressure to a station at which the container receives a cover which has been sterilized by treatment with superheated steam or heated non-condensible gas at four pounds pressure for four minutes in the cover sterilizer. The cover is clinched loosely to the lip of the container sufficiently securely to hold it in place against an internal pressure of two or three pounds per square inch. The container, with its cover clinched to its lip, is removed from the filling room through a rotary valve into the outside atmosphere and, with steam generated by boiling of the water on the surface of the container contents, issuing from the container through the restricted opening between the cover and the lip of the container, the container is sealed. The container is then cooled to the desired temperature for storage.

*Example V.*—Shelled green peas, having a pH value of about 6.1, are heated in bulk in a product heater, of appropriate design of either a continuous or a batch type. The time required to heat the product to maximum sterilizing temperature of, say, 300° F. is approximately 100 seconds. The food product is not held at 300° F. but is put into a cooling operation immediately after the temperature of 300° F. is reached. The food is cooled to its filling temperature of, say, 250° F. in approximately 60 seconds.

The product enters the sterile hopper of the filler at a temperature of 250° F. and is maintained at that temperature under a pressure of at least 15 pounds per square inch gauge within the hopper, located within a filling room maintained at a pressure of 13 pounds per square inch gauge by means of fresh air which has been previously treated for sterilization by filtering or by other means and which is suitable as an atmosphere in which an operator can work. All surfaces of the filler which contact the food during filling of the containers are sterile from previous treatment with steam under pressure. During operation of the filler, the surfaces, as well as the upper portions of the containers, and the food product in the hopper, are enveloped in saturated steam, under 13 pounds or more of guage pressure to ensure protection of the food product against contamination with stray microorganisms from the air of the room.

Into containers, which have been sterilized by treatment with saturated steam at 13 pounds gauge pressure for ten minutes in the container sterilizer, the sterile food is filled asceptically to somewhat more than the required weight for the finished contents of the container. The open, filled, container, with its upper end enveloped in saturated steam at 13 pounds gauge pressure, and with steam, generated by evaporation of both surface and internal water of the solid food product, issuing from the container, is conveyed to a station at which the container receives a cover, which has been sterilized with saturated steam at 13 pounds gauge pressure for 10 minutes in a cover sterilizer. During the travel of the container from the filling station to the station at which the container receives its cover, the container moves beneath a surface which is continuously cooled so that steam issuing from the container or otherwise supplied to the steam atmosphere enveloping the top of the container is condensed. The cooled surface is so designed and equipped with baffles that condensate which is formed drops continuously into the container, thus replenishing moisture which is lost from the container as steam generated by evaporation of water from the peas. While the cover is held in loose contact with the lip of the container with sufficient resistance to keep the cover in place against the force of an internal pressure of two or three pounds per square inch, the container is removed through a rotary valve from the filling room into the sealing chamber, in which pressure is maintained by means of air, which has not been treated for sterilization, at about 11 pounds per square inch gauge. The container, surrounded by the atmosphere of the sealing chamber, while steam, generated by evaporation of both surface and internal water of the peas, issues from it through the restricted opening between the cover and the lip of the container, is sealed. The container is then cooled to the desired temperature for storage, being removed from the sealing chamber through a rotary valve either before cooling is begun or after part of the cooling has taken place. The filling and closing of each container is accomplished within the space of about 10 seconds.

*Example VI.*—Whole kernels of young corn, having a pH value of about 6.1, are heated in bulk in a product heater of suitable design of either continuous or a batch type. The time required to heat the product to maximum sterilizing temperature of, say, 300° F. is approximately 100 seconds. The food product is not held at 300° F. but is cooled immediately after the temperature of 300° F. is reached. The food is cooled to its filling temperature of, say, 255° F. in approximately 55 seconds.

The corn kernels enter the sterile hopper of a filler at the temperature of 255° F. and are maintained at that temperature under a pressure of at least 18 pounds per square inch gauge within the hopper, located within a filling room maintained at a pressure of 16 pounds gauge pressure by means of fresh air which has been sterilized by filtering or by other means. All surfaces of the filler which contact the food during the filling of the containers are sterile from previous treatment with steam under pressure. During operation of the filler, these surfaces, as well as the upper portions of the containers and the food product in the hopper, are enveloped in saturated steam under 16 pounds or more guage pressure to ensure protection to the food product against contamination with stray microorganisms from the air of the room.

Into containers which have been sterilized by treatment with saturated steam at 16 pounds gauge pressure for 5 minutes in the container sterilizer, sterile water or brine at a temperature of approximately 250° F. is filled aseptically in an amount of from 3 to 25 percent of the volume capacity of each container. Kernels of corn at a filling temperature of approximately 255° F. are then put into the containers to an aggregate weight somewhat greater than the required weight of the finished contents of the container. The open, filled, container, with its upper end enshrouded in saturated steam under 16 pounds gauge pressure, and with steam, generated by evaporation of both surface and internal water of the corn kernels, issuing from the container, is conveyed to a closing machine located within the same chamber as the filler, by the action of which machine, the container receives a cover which has been sterilized with saturated steam at 16 pounds gauge pressure for five minutes in the container sterilizer and the container is sealed with this cover. During the travel of the container from the filling point to the point at which it receives its cover, the container moves along beneath a surface which is continuously cooled so that steam, issuing from the container or otherwise supplied to the steam atmosphere enveloping the top of the container, is condensed. The cooled surface is so designed and equipped with baffles that condensate which is formed drops continuously into the container, thus replenishing moisture which is lost from the container as steam generated by evaporation of water from the kernels. The container is then cooled to the desired temperature for storage, being removed from the filling and sealing chamber through a rotary valve either before cooling is begun or after a part of the cooling has taken place. The filling and sealing of each container is accomplished within the space of about 10 seconds.

*Example VII.*—Pieces of chicken, containing bones, of irregular shapes, which obviate the possibility of filling into containers by means of mechanical fillers, are heated in bulk in a product heater in which the chicken flesh is pierced with steam nozzles, by means of which steam is released within the flesh and condensate formed therein is removed. The time required to heat the product to a maximum sterilizing temperature of, say, 270° F. is approximately three minutes. The chicken is held at 270° F. for 40 seconds and is then passed into a cooling operation. The product is cooled to a filling temperature of 259.5° F. in about 15 seconds. The product enters a sterile hopper at the temperature of 259.5° F. within a filling room maintained at a pressure of 21 pounds per square inch gauge by means of fresh air which has been treated for sterilization by filtering or by other means and in which persons work.

Into containers, which have been sterilized with saturated steam at 21 pounds gauge pressure for about 3 minutes in a container sterilizer, sauce which has been sterilized by treating at a temperature of, say 305° F. for 50 seconds, then cooled in five seconds to a filling temperature of 254° F., is filled at 254° F. by means of a sterile mechanical filler located within the filling room. Each container is filled with sauce to approximately 23 per cent of its volume capacity. Pieces of the sterilized chicken are discharged from the sterile hopper, which received them from the cooling device, into the atmosphere of the filling room and these pieces, at a temperature of approximately 259.5° F. are filled by persons wearing gloves made of suitable material, which gloves have previously been sterilized, into the containers which had previously received the sauce. Each container is filled to somewhat more than the required weight for the finished contents of the container. The open, filled, container, with its upper end enshrouded in saturated steam at 21 pounds gauge pressure, is conveyed to a station at which it receives a cover that has been sterilized in a container sterilizer by treatment with saturated steam at 21 pounds gauge pressure for about three minutes. The cover is held in loose contact with the lip of the container with sufficient resistance to hold the cover in place against an internal pressure of from two to four pounds per square inch. The container, with its cover, is removed through a rotary valve from the filling room into the sealing room, which is maintained at a pressure of about 17 pounds per square inch gauge by means of air which has not been treated for sterilization, all the while the cover being held in loose contact with the container lip. The container, surrounded by the atmosphere of the sealing chamber, while steam, generated by boiling of surface and interior water of the solid pieces of chicken in the upper part of the container, which are above the surface of the sauce in the container, issues from it through the restricted opening between the cover and the lip of the container, is sealed. The filled and sealed container is held without intentional cooling for about 70 seconds to allow the residual heat in the contents of the container, holding a temperature of about 254–255° F. in the contents, to destroy any bacteria that might have gained entrance with the chicken at the time of filling, and thus to ensure complete sterility of the container contents before cooling. The container is then cooled to the desired temperature for storage, being removed from the sealing chamber through a rotary valve either before cooling is begun or after a part of the cooling has taken place. The filling and sealing of each container is accomplished within the space of about 30 seconds.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following procedured combinations, or equivalents thereof, by Letters Patent of the United States:

1. A canning process for a low-acid food product which comprises heating of the food product to a maximum sterilization temperature for a relatively short period of time under a superatmospheric pressure great enough to prevent boiling of the product liquid, cooling the product from such maximum temperature to a filling temperature above the boiling point of the product liquid at atmospheric pressure, while maintaining the product under superatmospheric conditions of pressure sufficient to inhibit boiling of the product liquid, filling the product while maintaining a superatmospheric condition of pressure about the product into previously sterilized containers, causing steam to be generated within the container and during the emission of steam applying a previously sterilized cover loosely to the filled container, and permanently and securely sealing the cover to the container in an atmosphere having a pressure value lower than the value of the pressure existing about the product at the time of the filling of the container to cause the emission of steam from under the loosely applied cover to continue until the container has been completely sealed.

2. A canning process for a low-acid food product which comprises rapidly heating the food product to a maximum sterilization temperature, in from 10 to 180 seconds and holding the food at that temperature for a period of time not exceeding 4½ minutes while maintaining the product under a superatmospheric pressure great enough to prevent boiling of the product liquid, cooling the product from such maximum temperature to a filling temperature within the range of from 230° to 270° F. while maintaining the product under superatmospheric pressure sufficient to inhibit boiling of the product liquid, filling the product into a previously sterilized container while maintaining a superatmospheric condition of pressure about the product, causing steam to be generated within the container and during the emission of steam applying a previously sterilized cover loosely to the filled container, and permanently and securely sealing the cover to the container in an atmosphere having a pressure value lower than the value of pressure existing about the product at the time of filling the container to cause the emission of steam from under the loosely applied cover to continue until the container has been completely sealed.

3. The process of claim 2 in which the superatmospheric pressure maintained about the food product during the sterilization thereof is within the range of from 35 to 53 pounds per square inch gauge and the pressure in the said atmosphere where the cover is sealed to the container is within the range of from 2 to 27 pounds per square inch gauge.

4. A canning process for a low-acid food product which comprises heating the food product to a temperature of from 280° to 300° F. under a superatmospheric pressure of from 35 to 53 pounds per square inch gauge, cooling the product to a filling temperature of from 230° to 270° F., filling the product while under a superatmospheric condition of pressure of from 12 to 30 pounds per square inch gauge into a previously sterilized container, applying a previously sterilized cover loosely to the filled container, causing steam to be generated within the container and to be emitted from under its loosely applied cover, permanently and securely sealing the cover to the container in an atmosphere having a pressure value within a range of 2 to 27 pounds per square inch gauge and during the emission of steam therefrom, and cooling the sealed product for storage.

5. The canning process of claim 4 including the step of delivering a quantity of hot liquid into the container before the cover is loosely applied, such supplementary liquid furnishing the bulk of the fluid subsequently emitted from the unsealed container as steam.

6. The canning process of claim 4 including the step of delivering into the container a quantity of liquid having a temperature lower than the temperature of the solid portions of the food product so as to cool a portion of the solid food whereby to inhibit the generation of steam from the said cooled portion of the product when the filled container enters the said reduced pressure atmosphere.

7. The method of processing a low-acid food product which comprises rapidly heating the food product to a maximum temperature within the range of from 250° to 310° F. in 10 to 180 seconds and holding the product at said temperature for a period up to 4½ minutes, then abruptly cooling the heated food product to a filling temperature within the range of from 100° to 270° F., inserting the product into containers and thereafter applying covers loosely to the filled containers, conveying the applying covers loosely to the filled containers, causing steam to be generated within the containers and to be emitted from under their loosely applied covers, and permanently and securely affixing the covers to the filled containers during the said emission of steam therefrom.

8. The process of claim 7 including the step of adding a quantity of supplementary hot liquid into the containers to furnish water for steam generation.

9. The canning process of claim 7 including the step of delivering into the container a quantity of liquid having a temperature lower than the temperature of the solid portions of the food product so as to cool a portion of the solid food whereby to inhibit the generation of steam from the said cooled portion of the product when the filled container enters the said reduced pressure atmosphere.

10. The method of processing a low-acid food product which comprises rapidly heating the food product to a maximum temperature within the range of from 280° to 300° F. in 10 to 90 seconds, then abruptly cooling the heated food product to filling temperature within a range of from 200° to 270° F. inserting the product into a container in a pressure atmosphere of from 4 to 30 pounds per square inch gauge and applying a cover loosely to the filled container, conveying the filled container and its loosely applied cover to another atmosphere having a pressure value within the range of from sub-atmospheric to 27 pounds per square inch gauge, causing steam to be generated within the container and to be emitted from under its loosely applied cover, and permanently and securely affixing the cover to the filled container during the said emission of steam therefrom.

11. The canning process of claim 10 which includes the step of inserting a quantity of hot liquid into the container to furnish additional water for steam generation.

12. The canning process of claim 10 in which the step of inserting a quantity of hot liquid into the container is performed subsequent to the insertion therein of the main food product so that such liquid forms a layer at the top of the food product.

13. The canning process of claim 10 including the step of delivering into the container a quantity of liquid having a temperature lower than the temperature of the solid portions of the food product so as to cool a portion of the solid food whereby to inhibit the generation of steam from the said cooled portion of the product when the filled container enters the said reduced pressure atmosphere.

14. A process of canning low-acid food product which comprises heating the food product rapidly to a maximum sterilization temperature under a condition of pressure great enough to inhibit boiling of the product liquid in a period of from 10 to 180 seconds and holding the product at such temperature for a period not exceeding 4½ minutes, abruptly cooling the sterilized product to a filling temperature within the range of from 230° to 270° F. under pressure conditions great enough to inhibit boiling of the product liquid, filling the product into a previously sterilized container under pressure conditions great enough to inhibit boiling of the product liquid and applying a cover loosely to the filled container while maintaining a pressure condition about the product sufficient to inhibit boiling of the product liquid, causing steam to be generated within the container as the filled container with its loosely applied cover is transferred to a chamber having a pressure value lower than the pressure value existing about the product during the filling and the cover applying steps, and permanently attaching the cover to the container to seal the contents.

15. A process for canning a low-acid food product which comprises heating the food product rapidly to temperature of approximately 300° F. in from 10 to 90 seconds and under a condition of pressure great enough to inhibit boiling of the product liquid, said pressure condition having a value of approximately 53 pounds per square inch gauge, holding the product at such temperature for a period of not exceeding 30 seconds, abruptly cooling the sterilized product to a filling temperature within the range of from 230° to 270° F. under a pressure condition of from 6 to 30 pounds per square inch gauge, filling the product into a previously sterilized container and applying a cover loosely thereto while maintaining a pressure condition about the product in the said range of from 6 to 30 pounds, causing steam to be generated within the container as the filled container with its loosely applied cover is transferred to a chamber having a pressure condition on the order of from 5 to 27 pounds per square inch, permanently attaching the cover to the container in said chamber to seal the contents, holding the sealed container for approximately one minute, and then cooling the sealed container and its contents for storage.

16. A process for canning low-acid food product which comprises heating the food product rapidly to temperature of approximately 300° F. in from 10 to 90 seconds and under a condition of pressure great enough to inhibit boiling of the product liquid, said pressure condition having a value on the order of 53 pounds per square inch gauge, holding the product at such temperature for a period of not exceeding 30 seconds, abruptly cooling the sterilized product to a filling temperature within the range of from 230° to 270° F. under a pressure condition of from 6 to 30 pounds per square inch gauge, filling the product under pressure of from 10 to 33 pounds per square inch gauge with the addition of supplementary liquid having a temperature of 5° F. higher than the product into a previously sterilized container and applying a cover loosely thereto while maintaining a pressure condition about the product on the order of from 6 to 30 pounds, causing steam to be generated within the container by the said supplementary liquid as the filled container with its loosely applied cover is transferred to a chamber having a pressure condition on the order of from 5 to 27 pounds per square inch gauge, permanently attaching the cover to the container in said chamber to seal the contents, holding the sealed container for approximately one minute and then cooling the sealed container and its contents for storage.

17. A sterilization process for low-acid food product comprising heating the food product rapidly and uniformly to a maximum sterilization temperature of approximately 270° F. by injecting steam to interior portions of the product and holding the temperature at said 270° F. for approximately 40 seconds, then cooling the product to a temperature of approximately 259° F. in approximately 15 seconds, then filling the product into previously sterilized containers in a pressure atmosphere having a value on the order of 21 pounds per square inch gauge, delivering supplementary liquid at a temperature of approximately 254° F. into the containers, maintaining the container enshrouded in saturated steam at approximately 21 pounds gauge pressure during the aforesaid filling operations, applying a previously sterilized cover loosely to the filled container, causing steam to be generated within the container as the filled container and its loosely applied cover are transferred to an atmosphere having a pressure value on the order of 17 pounds per square inch gauge, and sealing the cover permanently to the filled container in said last mentioned reduced pressure atmosphere.

18. A canning process for a food product comprising heating the product to a maximum sterilization temperature and delivering the sterilized product to a container filling mechanism, delivering a previously sterilized container to the filling mechanism, maintaining the container and filling mechanism enshrouded in an atmosphere of saturated steam at a pressure within a range of from 12 to 20 pounds per square inch gauge during the delivering and filling operations, transporting the open, filled, container to a cover applying station and loosely applying a previously sterilized cover thereto, restoring to the interior of the container water lost as steam during the transporting operation prior to the application of the cover, moving the covered container to a cover sealing station about which a superatmospheric pressure condition on the order of from 6 to 27 pounds per square inch gauge is maintained whereby steam is caused to evolve from beneath the loosely applied cover of the filled container, and sealing the filled container in said last mentioned reduced pressure atmosphere.

19. A canning process for a food product which comprises filling a previously sterilized food product at a temperature of within the range of from 230° to 270° F. into a previously sterilized container in an atmosphere maintained at pressure within a range of from 6 to 27 pounds per square inch gauge pressure, applying a previously sterilized cover loosely to the filled container, causing steam to be generated within the container as the filled container and its loosely applied cover are transferred to a container sealing station situated in an atmosphere maintained at a pressure value approximately 10 pounds lower than the pressure existing about the product during the filling operation, and sealing the cover to the container in said last mentioned reduced pressure atmosphere.

20. A canning process for a low-acid food product which comprises heating the food product rapidly to a maximum sterilization temperature under superatmospheric conditions of pressure great enough to inhibit boiling of the product liquid, filling the product into a previously sterilized container under superatmospheric conditions of pressure lower than the said sterilizing pressure while maintaining the temperature of the product higher than its boiling temperature at the said filling pressure so that steam is emitted from the container during and immediately following the filling thereof, applying a previously sterilized cover loosely to the filled container, transferring the filled container and its loosely applied cover to an atmosphere having a pressure value lower than the pressure prevailing about the product during the filling operation so that steam continues to be emitted from beneath the loosely applied cover on the filled container, and quickly sealing the cover to the container in said last named atmosphere during the emission of steam from the container.

21. A canning process for a low-acid food product which comprises heating the food product rapidly to a maximum sterilization temperature under superatmospheric conditions of pressure great enough to inhibit boiling of the product liquid, filling the product into a previously sterilized container under superatmospheric conditions of pressure lower than the said sterilizing pressure while maintaining the temperature of the product higher than its boiling temperature at the said filling pressure so that steam is emitted from the container during and immediately following the filling thereof, applying a previously sterilized cover to the filled container, and quickly sealing the cover to the container during the emission of steam from the container.

22. The canning process of claim 4 in which a portion of the food product to be delivered into each container is cooled before being delivered into the container to a temperature value lower than the boiling point of the product liquid under the pressure condition of from 2 to 27 pounds per square inch gauge, obtaining in the said reduced pressure atmosphere, while the remaining portion of the food product delivered into each container has temperature value higher than the boiling point of the product under the pressure condition obtaining in the said reduced pressure atmosphere.

CHARLES OLIN BALL.

References Cited in the file of this patent

UNITED STATES PATENTS

| Number | Name | Date |
|---|---|---|
| 2,514,027 | Clifcorn et al. | July 4, 1950 |
| 2,541,113 | Smith et al. | Feb. 13, 1951 |